United States Patent
DeWitt et al.

(10) Patent No.: US 10,823,625 B1
(45) Date of Patent: Nov. 3, 2020

(54) OVERHEAT TESTING APPARATUS FOR OPTICAL FIBER

(71) Applicant: Kidde Technologies, Inc., Wilson, NC (US)

(72) Inventors: Darryl J. DeWitt, Raleigh, NC (US); Lei Liu, Wake Forest, NC (US)

(73) Assignee: KIDDE TECHNOLOGIES, INC., Wilson, NC (US)

( * ) Notice: Subject to any disclaimer, the term of this patent is extended or adjusted under 35 U.S.C. 154(b) by 0 days.

(21) Appl. No.: 16/417,130

(22) Filed: May 20, 2019

(51) Int. Cl.
| | |
|---|---|
| *G01K 11/32* | (2006.01) |
| *G01M 11/00* | (2006.01) |
| *G02B 6/42* | (2006.01) |
| *B64D 45/00* | (2006.01) |
| *G08B 17/06* | (2006.01) |
| *G01K 3/00* | (2006.01) |
| *H04B 10/071* | (2013.01) |

(52) U.S. Cl.
CPC .......... *G01K 11/3206* (2013.01); *B64D 45/00* (2013.01); *G01K 3/005* (2013.01); *G01M 11/33* (2013.01); *G02B 6/4266* (2013.01); *G08B 17/06* (2013.01); *H04B 10/071* (2013.01); *B64D 2045/009* (2013.01); *B64D 2045/0085* (2013.01)

(58) Field of Classification Search
CPC .................................................. G01K 11/3206
See application file for complete search history.

(56) References Cited

U.S. PATENT DOCUMENTS

| | | | |
|---|---|---|---|
| 5,963,680 A | 10/1999 | Kleinerman | |
| 6,204,920 B1* | 3/2001 | Ellerbrock | G01D 5/35383 250/227.13 |
| 6,411,746 B1* | 6/2002 | Chamberlain | G02F 1/0115 385/10 |
| 6,489,606 B1* | 12/2002 | Kersey | G01D 5/35303 250/227.14 |
| 6,876,786 B2* | 4/2005 | Chliaguine | G01D 5/35303 250/227.11 |
| 7,157,692 B2 | 1/2007 | Taylor et al. | |

(Continued)

FOREIGN PATENT DOCUMENTS

| | | |
|---|---|---|
| DE | 19933268 A1 | 1/2001 |
| EP | 1524509 A1 | 4/2005 |

(Continued)

OTHER PUBLICATIONS

European Search Report Issued in European Application No. 19210188.9 dated Jun. 23, 2020; 13 Pages.

(Continued)

*Primary Examiner* — Rhonda S Peace
(74) *Attorney, Agent, or Firm* — Cantor Colburn LLP

(57) ABSTRACT

Disclosed is an optical fiber overheat detection testing apparatus. The apparatus includes an optical fiber having a first end and a second end, the optical fiber having a predetermined length associated with a predetermined attenuation based on an overheat detection instrument loop. The apparatus includes a first fiber Bragg grating disposed on the optical fiber having a first wavelength spectrum based on a first temperature detection apparatus. The apparatus includes a second fiber Bragg grating disposed on the optical fiber having a second wavelength spectrum based on at least one of a plurality of overheat detection apparatuses.

20 Claims, 6 Drawing Sheets

(56) References Cited

U.S. PATENT DOCUMENTS

| | | | |
|---|---|---|---|
| 7,418,171 B2* | 8/2008 | Grattan | G01L 1/242 |
| | | | 374/E11.016 |
| 7,538,860 B2* | 5/2009 | Moore | G02B 6/02076 |
| | | | 356/35.5 |
| 7,787,726 B2* | 8/2010 | Ten Eyck | A41D 13/1281 |
| | | | 2/69 |
| 8,172,180 B2* | 5/2012 | Press | B64D 15/20 |
| | | | 244/134 F |
| 8,488,114 B2 | 7/2013 | Gaspari | |
| 10,112,726 B2* | 10/2018 | Wilson | B64D 45/00 |
| 10,260,964 B2* | 4/2019 | Fisk | G01K 11/3206 |
| 10,408,694 B2* | 9/2019 | Jaaskelainen | G01L 1/246 |
| 10,436,652 B2* | 10/2019 | Wilson | G01L 1/242 |
| 2002/0125414 A1* | 9/2002 | Dammann | B64D 45/00 |
| | | | 250/227.14 |
| 2004/0052299 A1* | 3/2004 | Jay | G01M 11/33 |
| | | | 374/183 |
| 2008/0285916 A1* | 11/2008 | Sappey | G01J 5/60 |
| | | | 385/27 |
| 2009/0040046 A1 | 2/2009 | Browning, Jr. et al. | |
| 2010/0066548 A1 | 3/2010 | Cox et al. | |
| 2013/0322490 A1 | 12/2013 | Bell et al. | |
| 2014/0266742 A1* | 9/2014 | Rennie | G08B 5/36 |
| | | | 340/584 |
| 2015/0212273 A1 | 7/2015 | Sandstrom et al. | |
| 2015/0323418 A1 | 11/2015 | Cheng et al. | |
| 2017/0334575 A1* | 11/2017 | Wilson | B64D 45/00 |
| 2017/0336268 A1* | 11/2017 | Wilson | G01K 11/3206 |
| 2017/0371117 A1* | 12/2017 | Jebali | G05D 23/02 |
| 2018/0340841 A1* | 11/2018 | Coreth | G01K 11/3206 |
| 2019/0025095 A1 | 1/2019 | Steel et al. | |
| 2019/0277669 A1* | 9/2019 | Miller | G01D 5/35303 |
| 2019/0277708 A1* | 9/2019 | Miller | G01D 18/00 |
| 2019/0277709 A1* | 9/2019 | Miller | G02B 6/02076 |
| 2019/0383672 A1* | 12/2019 | Liu | B64D 45/00 |

FOREIGN PATENT DOCUMENTS

| | | |
|---|---|---|
| EP | 3246683 A1 | 11/2017 |
| JP | 107324994 A | 12/1995 |

OTHER PUBLICATIONS

European Search Report Issued in European Application No. 19212777.7 dated Jun. 23, 2020; 12 Pages.

\* cited by examiner

OVERHEAT TESTING APPARATUS FOR OPTICAL FIBER

BACKGROUND

Exemplary embodiments pertain to the art of overheat testing equipment for optical fiber aircraft temperature detection systems. Temperature detection may be provided to aircraft operators and controllers. Such systems may require testing and assessment to determine proper operation.

BRIEF DESCRIPTION

Disclosed is an optical fiber overheat detection testing apparatus. The apparatus includes an optical fiber having a first end and a second end, the optical fiber having a predetermined length associated with a predetermined attenuation based on an overheat detection instrument loop. The apparatus includes a first fiber Bragg grating disposed on the optical fiber having a first wavelength spectrum based on a first temperature detection apparatus. The apparatus includes a second fiber Bragg grating disposed on the optical fiber having a second wavelength spectrum based on at least one of a plurality of overheat detection apparatuses.

In addition to one or more of the features described above, or as an alternative, further embodiments may include a third fiber Bragg grating disposed on the optical fiber having a third wavelength spectrum based on a third temperature detection apparatus.

In addition to one or more of the features described above, or as an alternative, further embodiments may include that the first wavelength spectrum is distinct from the second wavelength spectrum such that wavelengths associated with the first wavelength spectrum are not reflected by the second wavelength spectrum.

In addition to one or more of the features described above, or as an alternative, further embodiments may include that the first wavelength spectrum is defined by a first refractive index associated with the first fiber Bragg grating is distinct from the second wavelength spectrum having a second refractive index.

In addition to one or more of the features described above, or as an alternative, further embodiments may include that the first wavelength spectrum is defined by a first grating period associated with the first fiber Bragg grating that is distinct from the second wavelength spectrum having a second grating period.

In addition to one or more of the features described above, or as an alternative, further embodiments may include that the first fiber Bragg grating is spaced from the first end by one half meter.

In addition to one or more of the features described above, or as an alternative, further embodiments may include a third fiber Bragg grating disposed on the optical fiber having a third wavelength spectrum based on a third temperature detection apparatus spaced from the first end by one meter and the second fiber Bragg grating is disposed between the first fiber Bragg grating and the third fiber Bragg grating.

In addition to one or more of the features described above, or as an alternative, further embodiments may include a test controller having stored test instructions operable upon execution to, responsive to a start command, increase a first temperature associated with the first fiber Bragg grating and receive a first temperature indication based on the first temperature.

In addition to one or more of the features described above, or as an alternative, further embodiments may include that the stored test instructions operable upon execution to alter the second wavelength spectrum associated with the second fiber Bragg grating according to a stress actuator based on a second temperature associated with the second fiber Bragg grating and receive a second temperature indication based on the second temperature.

In addition to one or more of the features described above, or as an alternative, further embodiments may include further comprising an operations controller having stored operations instructions operable upon execution to send an output signal through the optical fiber and, responsive to an input signal having wavelength within the first wavelength spectrum, send the first temperature indication.

In addition to one or more of the features described above, or as an alternative, further embodiments may include that the stored test instructions and the stored operations instructions are operable upon execution by a processor.

In addition to one or more of the features described above, or as an alternative, further embodiments may include that the second wavelength spectrum includes wavelengths associated with each of the plurality of overheat detection apparatuses.

A method includes increasing a first environmental temperature associated with a first fiber Bragg grating and receiving a first temperature indication based on the first environmental temperature. The method includes increasing a second environmental temperature associated with a second fiber Bragg grating and receiving a second temperature indication based on the second environmental temperature. The increase is responsive to receiving the first temperature indication.

In addition to one or more of the features described above, or as an alternative, further embodiments may include receiving a first wavelength spectrum defined by the first fiber Bragg grating according to the first environmental temperature.

In addition to one or more of the features described above, or as an alternative, further embodiments may include receiving a second wavelength spectrum defined by the second fiber Bragg grating according to the second environmental temperature, the second wavelength spectrum has a wider reflected bandwidth than the first wavelength spectrum.

In addition to one or more of the features described above, or as an alternative, further embodiments may include transmitting the first temperature indication based on the first wavelength spectrum and transmitting the second temperature indication based on the second wavelength spectrum.

In addition to one or more of the features described above, or as an alternative, further embodiments may include that the second wavelength spectrum corresponds to a plurality of overheat detection fiber Bragg gratings and the first wavelength spectrum corresponds to a temperature detection fiber Bragg grating.

Also disclosed is an optical fiber overheat detection testing apparatus. The apparatus includes an optical fiber having a first end and a second end, the optical fiber having a predetermined length associated with a predetermined attenuation based on an overheat detection instrument loop. The apparatus includes a first fiber Bragg grating disposed on the optical fiber, spaced from the first end by one half meter, and having a first wavelength spectrum based on a first temperature detection apparatus. The apparatus includes a third fiber Bragg grating disposed on the optical fiber, spaced from the first end by one meter having a third wavelength spectrum based on a third temperature detection apparatus. The apparatus includes a second fiber Bragg grating disposed on the optical fiber and equidistant from the first fiber Bragg grating and the third fiber Bragg grating having a second wavelength spectrum based on at least one of a plurality of overheat detection apparatuses.

In addition to one or more of the features described above, or as an alternative, further embodiments may include that the first wavelength spectrum is distinct from the second wavelength spectrum such that wavelengths associated with the first wavelength spectrum are not reflected by the second wavelength spectrum.

In addition to one or more of the features described above, or as an alternative, further embodiments may include a test controller having stored test instructions operable upon execution to, responsive to a start command, increase a first temperature associated with the first fiber Bragg grating and receive a first temperature indication based on the first temperature.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Optical fibers may be distributed throughout aircraft for temperature detection. For example, aircraft wings and sections associated with bleed air may be configured with optical fibers to detect overheat and provide temperature indications. Control signals may be sent from controllers through sensing instruments to detect temperature deviations. For example, fiber Bragg gratings may be disposed along an optical fiber instrument loop. The optical fiber instrument loop may terminate at a controller. The controller may have transmit and receive ports for sending and receiving a light spectrum.

The controller may be operable to detect a change in temperature through changes in received light spectrum after traversing the optical fiber. For the example, the changes may include attenuation of particular wavelengths or frequencies of the light spectrum. Further, a predetermined shift of the particular permitted wavelengths may occur proportionate or otherwise associated with the change in temperature. As such, the change in temperature associated with particular portions of the optical fiber may be detected.

Optical fiber may experience operational transients. For example, the optical fiber may include application of heat from heat guns or other apparatuses to alter the temperature of individual fiber Bragg gratings. Validation of performance may be detected by a controller conducting the test. Testing may occur offline or during operation.

Figure 1:
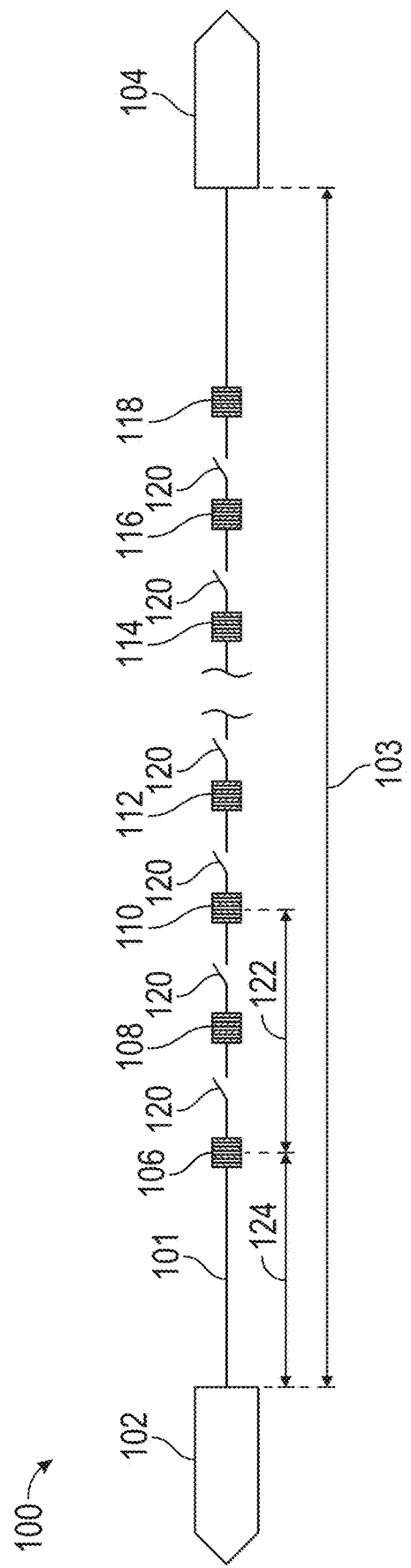
FIG. 1 includes an optical fiber overheat detection testing apparatus having fiber Bragg gratings.
Figure 5A:
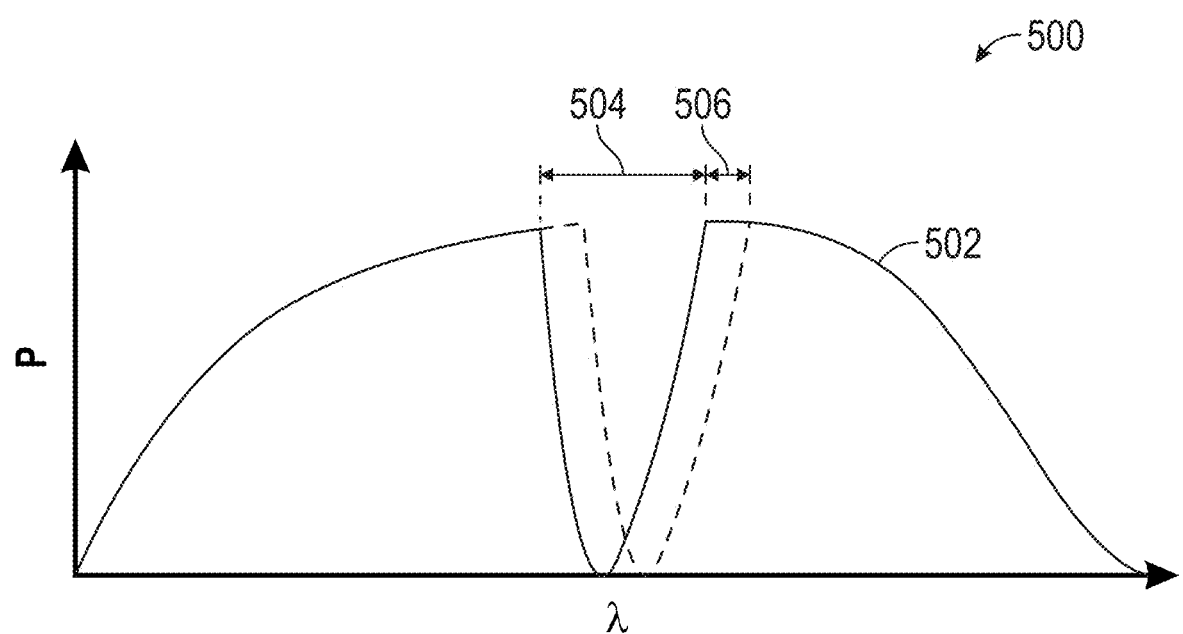
FIG. 5A is a light spectrum associated with a temperature detection fiber Bragg grating.
Figure 5B:
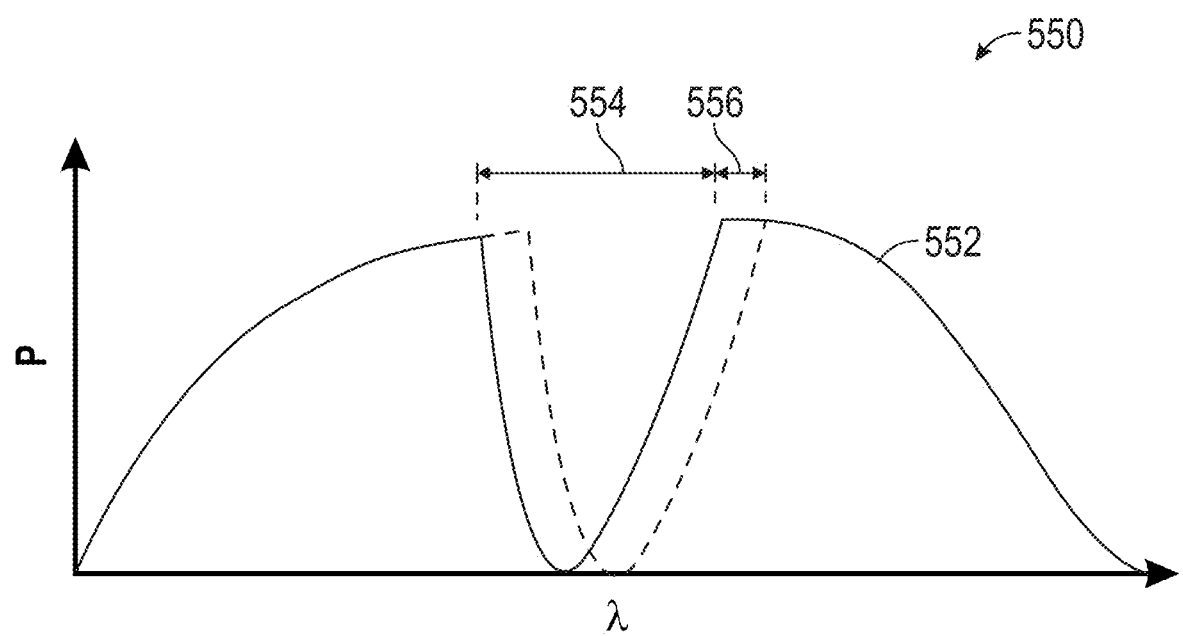
FIG. 5B is a light spectrum associated with an overheat detection fiber Bragg grating.

Referring to FIG. 1, portions 100 of an optical fiber overheat detection testing apparatus is shown. The optical fiber overheat detection testing apparatus includes an optical fiber 101. The optical fiber 101 has a first end 102 and a second end 104. The optical fiber 101 may have a predetermined length 103. The predetermined length may be associated with a predetermined attenuation. The predetermined attenuation may be based on an overheat detection instrument loop that the optical fiber overheat detection testing apparatus is intended to mimic. For example, the optical fiber overheat detection testing apparatus may be required to test a controller associated with an optical fiber overheat detection instrument loop on a wing of an aircraft. The optical fiber 101 includes a first fiber Bragg grating 106. The first fiber Bragg grating 106 may be formed by any means, including laser etching or chemical doping. The first fiber Bragg grating 106 may have a wavelength spectrum that is based on a first temperature detection apparatus. As shown in FIGS. 5A-5B, a wavelength spectrum defines the reflective and transmissive properties of the fiber Bragg grating. The first fiber Bragg grating 106 may be based on a corresponding fiber Bragg grating of the instrument loop being tested. That is, a wavelength spectrum of the first fiber Bragg grating 106 may mimic the wavelength spectrum of the fiber Bragg instrument of the instrument loop within the aircraft.

The first fiber Bragg grating 106 may be spaced from the first end by a predetermined distance 124. The predetermined distance 124 may be one half meter. A second fiber Bragg grating 108 may be disposed on the optical fiber 101. The second fiber Bragg grating 108 may be spaced from the first fiber Bragg grating 106 by a predetermined distance. The second fiber Bragg grating 108 may be formed by any means, including laser etching or chemical doping. The second fiber Bragg grating 108 may have a wavelength spectrum that is based on at least one of a plurality of overheat detection apparatuses. For example, an instrument loop in an aircraft may have overheat detection apparatuses or fiber Bragg gratings lined between respected temperature fiber Bragg gratings. The second fiber Bragg grating 108 may be disposed to mimic those over heat detection fiber Bragg gratings as one component—instead of a combination of multiple components. Such a reduction in the form factor of the testing optical fiber 101, as compared with the optical fiber install in an aircraft, is that the form factor reduction allows for insertion of bypass switches 120, which allow testing of individual fiber Bragg gratings on the optical fiber 101. That is, although the overall length 103 may be similar to that of an installed instrument loop on an aircraft, the second fiber Bragg grating 108 occupies a substantially smaller linear distance than fiber Bragg gratings of the instrument loop on the aircraft. The switches allow testing of controller responses associated with the instrument loop without deconstruction of the aircraft.

As shown in FIGS. 5A-5B, a wavelength spectrum defines the reflective and transmissive properties of the second fiber Bragg grating 108. The second fiber Bragg grating 108 may be based on a corresponding overheat fiber Bragg grating of the instrument loop being tested. That is, a wavelength spectrum of the second fiber Bragg grating 108 may mimic the wavelength spectrum of the overheat fiber Bragg instruments of the instrument loop within the aircraft or a portion thereof.

A third fiber Bragg grating 110 may be disposed on optical fiber 101. The third fiber Bragg grating 110 may be spaced from the first fiber Bragg grating 106 by a predetermined length 122. The predetermined length 122 may be one half meter. The second fiber Bragg grating 108 may be disposed equidistant between the first fiber Bragg grating 106 and the third fiber Bragg grating 110. Bypass switches 120 may be interspersed to allow bypassing of individual fiber Bragg gratings 106, 108, 110, 112, 114, 116, 118. The third fiber Bragg grating 110 may have a wavelength spectrum based on a third temperature sensor of an instrument loop installed in an aircraft. That is, the wavelength spectrum of reflected and transmitted light through the third fiber Bragg grating may be substantially similar to a fiber Bragg grating disposed on an optical fiber in an aircraft. The fiber Bragg gratings 106, 108, 110, 112, 114, 116, 118 may be distinct from one another in that the reflected and transmitted wavelengths of each of the gratings do not overlap. That is, the reflected wavelengths of the first fiber Bragg grating 106 does not overlap the reflected wavelengths of the second fiber Bragg grating 108, and the reflected wavelengths of the first fiber Bragg grating 106 do not overlap the reflected wavelengths of the third fiber Bragg grating 110.

Figure 2A:
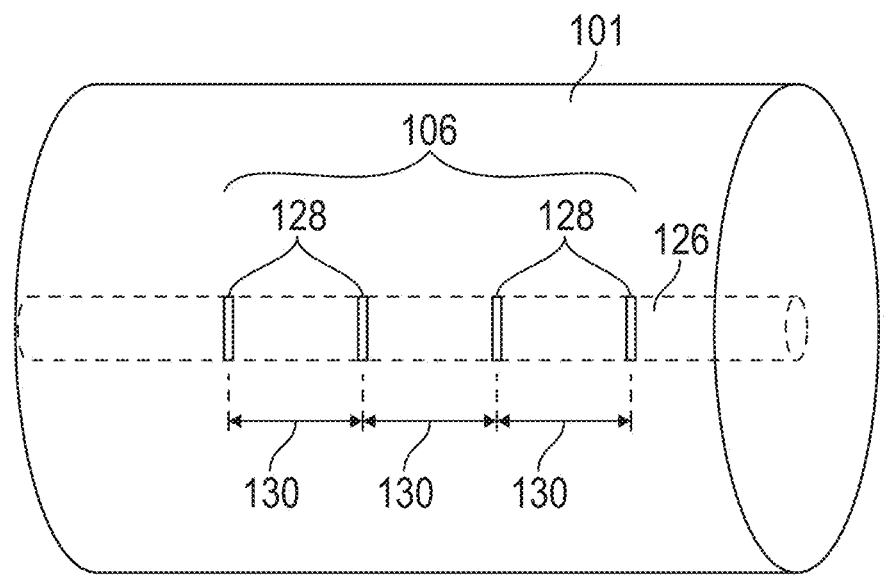
FIG. 2A includes a fiber Bragg gratings associated with temperature detection testing of an environment of the optical fiber.
Figure 2B:
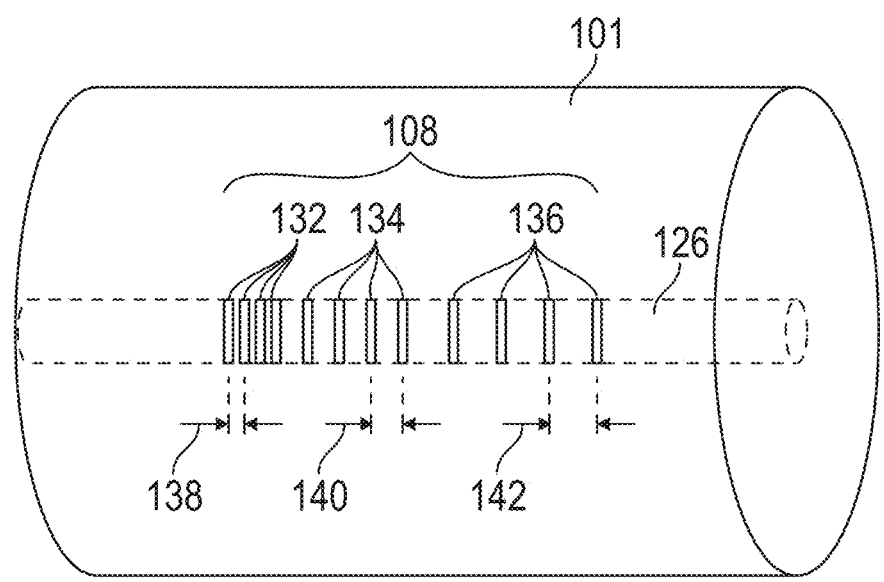
FIG. 2B includes a fiber Bragg gratings associated overheat detection testing of an environment of the optical fiber.

Referring to FIGS. 2A-2B, examples of the first fiber Bragg grating 106 geometry on optical fiber 101 is shown in FIG. 2A. The first fiber Bragg grating 106 has individual refractive portions 128. The refractive portions 128 are spaced by first grating period 130. The grating period 130 may define a first refractive index of the fiber Bragg grating such that the reflected wavelengths are based on equation (1).

$$\lambda_B = 2n_e \Lambda \quad (1),$$

where $\lambda_B$ is the wavelengths reflected by the first refractive or modal index $n_e$ and the first grating period $\Lambda$, 130. The refractive portions 128 may be spaced according to the grating period 130 to mimic a temperature instrument on aircraft instrument loop. FIG. 2B shows a second fiber Bragg grating 108 geometry on optical fiber 101. The second fiber Bragg gratin 108 has individual refractive portions 132, 134, 136. The refractive portions 132, 134, 136 may be spaced according to second grating periods 138, 140, 142 and have second refractive indices such that wavelengths reflected by the second fiber Bragg grating 108 mimic a plurality of overheat detection fiber Bragg gratings on an aircraft instrument loop. It should be appreciated that any combination of first refractive indices, second refractive indices, first grating periods, second grating periods or combinations thereof may be used to generate the wavelength spectrums of FIGS. 5A-5B.

The second fiber Bragg grating 108 is disposed to mimic the overheat instruments but may have a different structure than the dispersed instruments on an aircraft. As such, the form factor of the second fiber Bragg grating 108 is reduced, allowing for other components to be placed within the first fiber Bragg grating 106 and the third fiber Bragg grating 110 without adjusting length 122.

Figure 3A:
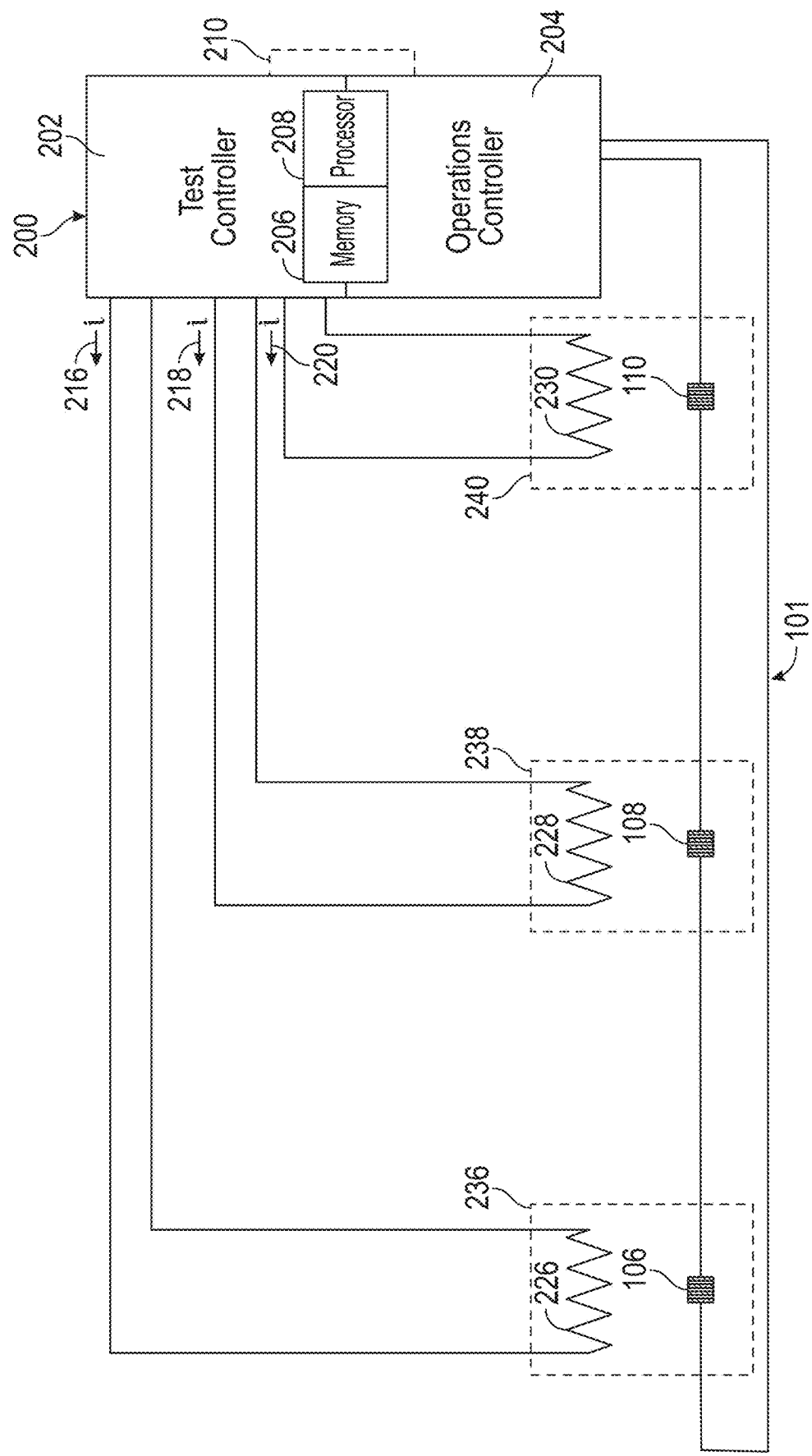
FIG. 3A is a schematic of a test controller and an operations controller associated with the optical fiber overheat detection testing apparatus.

Referring to FIG. 3, the optical fiber overheat detection testing apparatus is coupled with or includes controller 200. The controller 200 may include any combination of processors, field programmable gate arrays (FPGA), or application specific integrated circuits (ASIC). The controller may include memory, volatile and non-volatile, operable to store machine instructions from the processors and other processing mechanisms to receive, calculate, and control devices, as necessary. The stored instructions may be operable upon execution to perform the required function by the processor and associated processors. The Machine instructions may be stored in any language or representation, including but not limited to machine code, assembly instructions, C, C++, C#, PASCAL, COBAL, PYTHON, JAVA, and RUBY. It should be appreciated that any type of wired or wireless configuration is appreciated for any of the communications from the controller. Wireless protocols such as ZIGBEE, WI-FI, BLUETOOTH, or any other implement may be used. Communications may be realized through any protocol or medium known or unknown.

The controller 200 may include the test controller 202 and the operations controller 204. The controller test controller 202 may be disposed on or with the same hardware as the operations controller 204. The test controller 202 may be disposed independent of the operations controller 204. The test controller 202 may share a processor 214 and memory 212 with the operations controller 204. The test controller 202 may have an independent processor and associated memory. As one example, the operations controller 204 and the test controller 216 may include data channels 216 disposed to facilitate information exchange among the two and other controls apparatuses.

Operations controller 204 may include an interface to send light or output signal from the first end 102 through the optical fiber 101 for reception as an input signal at the second end 104. The test controller 202 may include interfaces associated with each one of the heating elements 226, 228, 230. Current 216, 218, 220 through heating elements 226, 226, 230 heats fiber Bragg gratings 106, 108, 110. The fiber Bragg gratings 106, 108, 110 may be thermally connected to the heating element 226, 228, 240 through containers 236, 238, 240. The containers 236, 238, 240 may be adhesive or binding to thermally connect the heating element 226 and the first fiber Bragg grating 106. The heating elements 226, 228, 230 may also or additionally include strain actuators to mechanically deform the respective Bragg gratings 106, 108, 110 to similarly or additionally alter the spectrum. Further, the strain actuators may replace the heating elements 226, 228, 230 and apply strain to the fiber Bragg gratings 106, 108, 110 that mimic heat from heating elements 226, 228, 230. As an example, the strain actuators may stretch the fiber Bragg gratings 106, 108, 110 a predetermined threshold corresponding to a temperature response of the fiber Bragg gratings 106, 108, 110.

Figure 3B:
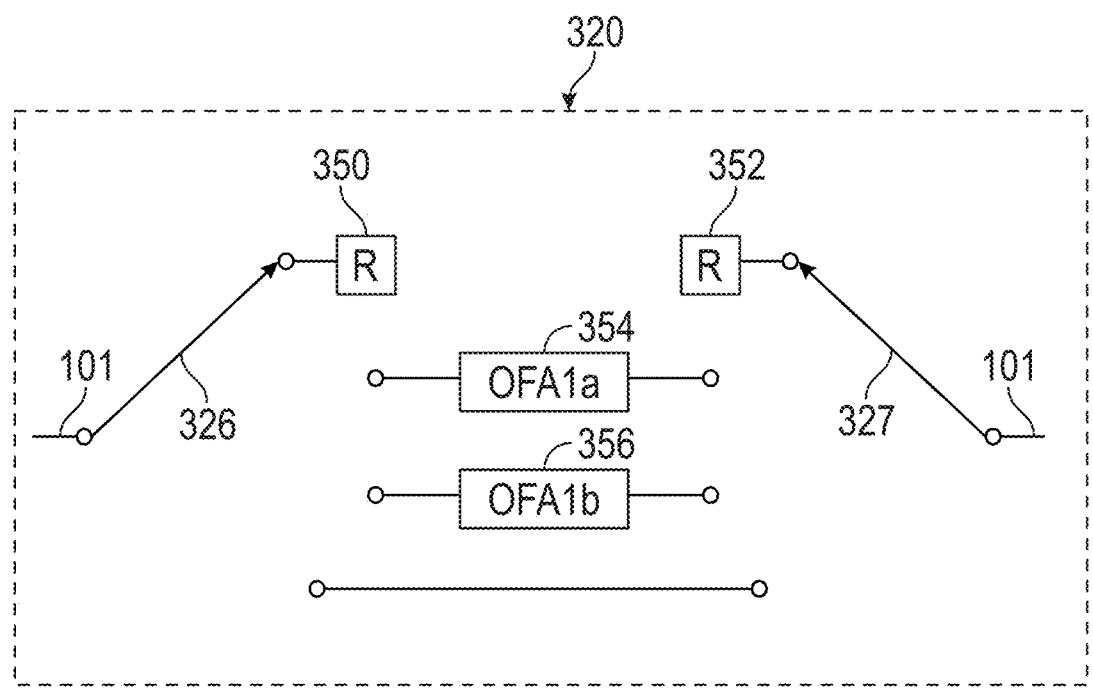
FIG. 3B is a schematic of a fiber optic switch.

As an example, FIG. 3B includes an interrupt 320. The bypass switches 120 may include similar components or configurations. As shown, the interrupt 320 includes opposing poles 326, 327 in a quad throw configuration. The first position of includes both of the opposing poles 326, 327 of the interrupt 320 terminating in respective reflectors 350, 352. The respective reflectors 350, 352 may reflect light received from optical fiber 101 back to respective ends 102, 104. Further, the opposing poles 326, 327 may be oriented in a second position to direct light of the optical fiber 101 through a first attenuator 354 having a first predetermined attenuation value. The opposing poles 326, 327 may be oriented in a third position to direct light of the optical fiber 101 through a second attenuator 356 having a second predetermined attenuation value. It should be appreciated that the interrupt 320 may include any number of attenuators. The opposing poles 326, 327 may be oriented in a fourth position to remove attenuation or reflection of light traveling on the optical fiber 101. The opposing poles 326, 327 may be oriented as disclosed with regard to other poles in this disclosure.

Figure 4:
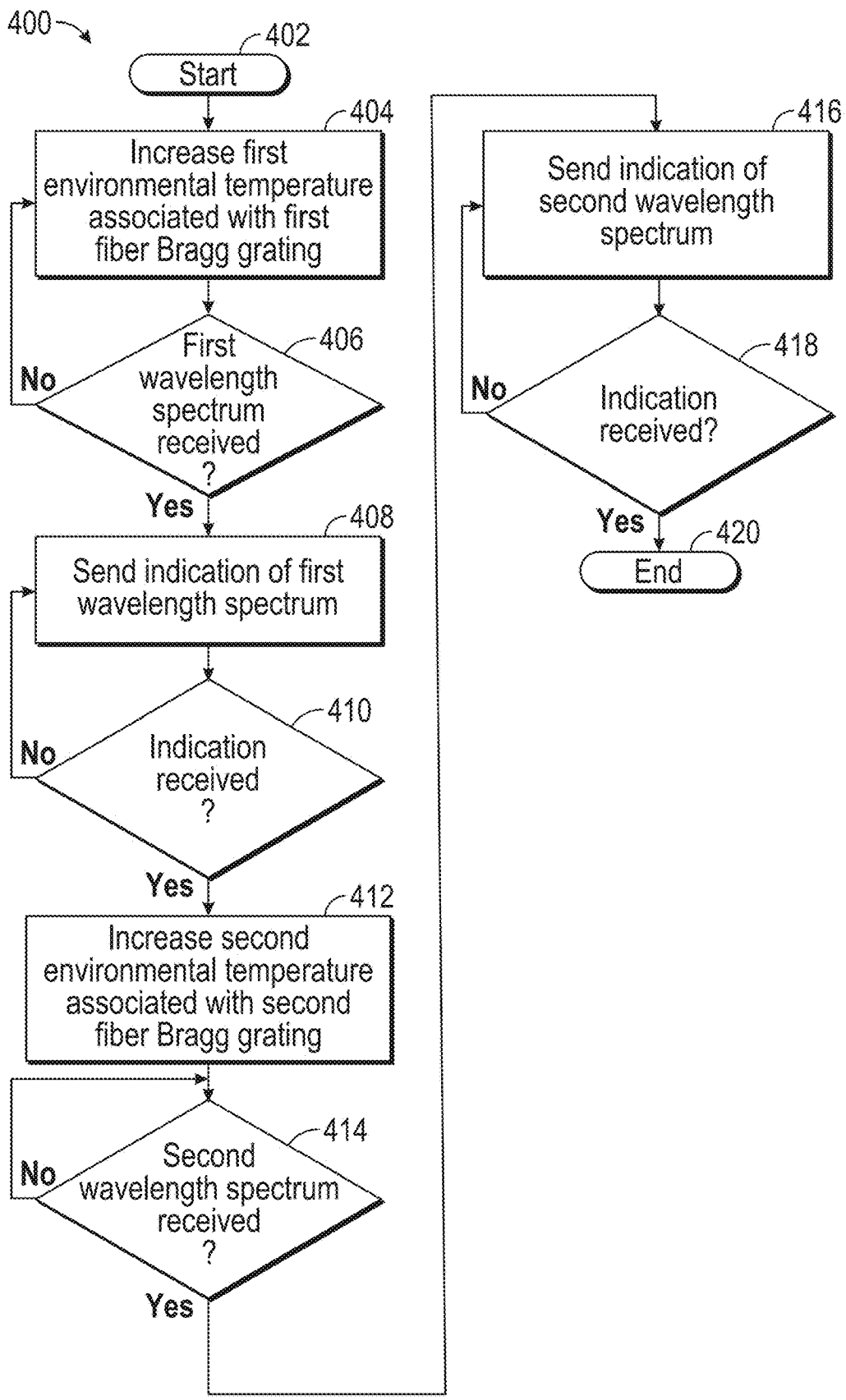
FIG. 4 is a method associated with testing an optical fiber overheat detection apparatus.

Referring to FIG. 4 a method 400 is shown. Method 400 begins in block 402. The method 400 may begin based on a start command from the test controller 202. In block 404 the test controller 202 increases a first environmental temperature associated with the first fiber Bragg grating 106 by increasing the current 216 flowing through heating element 226. In block 406, the controller 204 has memory instructions to determine whether the first wavelength spectrum is received as anticipated from the first fiber Bragg grating 106. In block 408 the controller 204 sends indication to the test controller 202 that the first wavelength spectrum was received. In block 410, the test controller 202 reports that the indication was received. The indication may be displayed or annunciated.

In block 412 the test controller 202 increases a second environmental temperature associated with the second fiber Bragg grating 108 by increasing the current 218 flowing through heating element 228. In block 414, the controller 204 has memory instructions to determine whether the first wavelength spectrum is received as anticipated from the first fiber Bragg grating 108. In block 416, the controller 204 sends indication to the test controller 202 that the first wavelength spectrum was received. In block 418, the test controller 202 reports that the indication was received. In block 420, the method ends. It should be appreciated that any of the steps or blocks may be repeated, omitted, rearranged, or performed in parallel. The temperature associated with the first Bragg grating 106 may be based on a temperature indication requirement associated with a span of the environmental temperature sensed. Further, the temperature associated with the second Bragg grating 108 may be based on an overheat indication having a baseline threshold for indicating overheat.

Referring to FIGS. 5A-5B graphs 500, 550 of incident wave spectrums is shown. The wavelength, λ, is shown along the horizontal axis, with received and transmitted power from controller 204 through ends 102, 104 is shown. FIG. 5A depicts a first wavelength spectrum 502 after traversing the first fiber Bragg grating 106 without reflected wavelengths 504. As the test controller 202 increased the temperature of the environment surrounding the first fiber Bragg grating 106, the first wavelength spectrum 502 shifted to temperature adjusted wavelength spectrum 508. As such, controller 204 is capable of detecting such shift 506 and outputting a first temperature indication corresponding to the first temperature driven by first heating element 226. FIG. 5B depicts a second wavelength spectrum 552 after traversing the second fiber Bragg grating 108 without reflected wavelengths 554. As the test controller 202 increased the temperature of the environment surrounding the second fiber Bragg grating 108, the second wavelength spectrum 552 shifted to temperature adjusted wavelength spectrum 558. As such, controller 200 has stored memory instructions operable to detect such a shift and output an indication. It should be appreciated that the reflected wavelengths 554 of the second wavelength spectrum 552 may have a wider reflected bandwidth 554 than the reflected wavelengths 504 of the first wavelength spectrum 502 as defined by the refractive index $n_e$ and the grating period, A. It should be appreciated that any of the fiber Bragg gratings 106, 108, 110, 112, 114, 116, 118 may generate respective waveform spectrums 504, 554 and respective offsets 506, 556. As such, the controller 200 may have stored memory instructions to detect the received wavelength spectrums 502, 552.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An optical fiber overheat detection testing apparatus comprising:
    an optical fiber having a first end and a second end, the optical fiber having a predetermined length associated with a predetermined attenuation based on an overheat detection instrument loop of a preexisting detection system;
    a first fiber Bragg grating disposed on the optical fiber having a first wavelength spectrum based on a first temperature detection apparatus of the preexisting detection system; and
    a second fiber Bragg grating disposed on the optical fiber having a second wavelength spectrum based on at least one of a plurality of overheat detection apparatuses of the preexisting detection system.

2. The optical fiber overheat detection testing apparatus of claim 1 further comprising, a third fiber Bragg grating disposed on the optical fiber having a third wavelength spectrum based on a third temperature detection apparatus of the preexisting detection system.

3. The optical fiber overheat detection testing apparatus of claim 1, wherein the first wavelength spectrum is distinct from the second wavelength spectrum such that wavelengths associated with the first wavelength spectrum are not reflected by the second wavelength spectrum.

4. The optical fiber overheat detection testing apparatus of claim 3, wherein the first wavelength spectrum is defined by a first refractive index associated with the first fiber Bragg grating and is distinct from the second wavelength spectrum having a second refractive index.

5. The optical fiber overheat detection testing apparatus of claim 3, wherein the first wavelength spectrum is defined by a first grating period associated with the first fiber Bragg grating that is distinct from the second wavelength spectrum having a second grating period.

6. The optical fiber overheat detection testing apparatus of claim 1, wherein the first fiber Bragg grating is spaced from the first end by one half meter.

7. The optical fiber overheat detection testing apparatus of claim 4 further comprising, a third fiber Bragg grating disposed on the optical fiber having a third wavelength spectrum based on a third temperature detection apparatus spaced from the first end by one meter and the second fiber Bragg grating is disposed between the first fiber Bragg grating and the third fiber Bragg grating.

8. The optical fiber overheat detection testing apparatus of claim 1 further comprising, a test controller having stored test instructions operable upon execution to, responsive to a start command, increase a first temperature associated with the first fiber Bragg grating and receive a first temperature indication based on the first temperature.

9. The optical fiber overheat detection testing apparatus of claim 8, wherein the stored test instructions operable upon execution to alter the second wavelength spectrum associated with the second fiber Bragg grating according to a stress actuator based on a second temperature associated with the second fiber Bragg grating and receive a second temperature indication based on the second temperature.

10. The optical fiber overheat detection testing apparatus of claim 8 further comprising an operations controller having stored operations instructions operable upon execution to send an output signal through the optical fiber and, responsive to an input signal having wavelengths within the first wavelength spectrum, send the first temperature indication.

11. The optical fiber overheat detection testing apparatus of claim 10 wherein the stored test instructions and the stored operations instructions are operable upon execution by a processor.

12. The optical fiber overheat detection testing apparatus of claim 1, wherein the second wavelength spectrum includes wavelengths associated with each of the plurality of overheat detection apparatuses.

13. A method comprising:
increasing a first environmental temperature associated with a first fiber Bragg grating and receiving a first temperature indication based on the first environmental temperature;
responsive to receiving the first temperature indication, increasing a second environmental temperature associated with a second fiber Bragg grating and receiving a second temperature indication based on the second environmental temperature.

14. The method of claim 13 further comprising, receiving a first wavelength spectrum defined by the first fiber Bragg grating according to the first environmental temperature.

15. The method of claim 14 further comprising, receiving a second wavelength spectrum defined by the second fiber Bragg grating according to the second environmental temperature, the second wavelength spectrum has a wider reflected bandwidth than the first wavelength spectrum.

16. The method of claim 15 further comprising, transmitting the first temperature indication based on the first wavelength spectrum and transmitting the second temperature indication based on the second wavelength spectrum.

17. The method of claim 15, wherein the second wavelength spectrum corresponds to a plurality of overheat detection fiber Bragg gratings and the first wavelength spectrum corresponds to a temperature detection fiber Bragg grating.

18. An optical fiber overheat detection testing apparatus comprising:
an optical fiber having a first end and a second end, the optical fiber having a predetermined length associated with a predetermined attenuation based on an overheat detection instrument loop of a preexisting detection system;
a first fiber Bragg grating disposed on the optical fiber, spaced from the first end by one half meter, and having a first wavelength spectrum based on a first temperature detection apparatus of the preexisting detection system;
a third fiber Bragg grating disposed on the optical fiber, spaced from the first end by one meter having a third wavelength spectrum based on a third temperature detection apparatus of the preexisting detection system; and
a second fiber Bragg grating disposed on the optical fiber and equidistant from the first fiber Bragg grating and the third fiber Bragg grating having a second wavelength spectrum based on at least one of a plurality of overheat detection apparatuses of the preexisting detection system.

19. The optical fiber overheat detection testing apparatus of claim 18, wherein the first wavelength spectrum is distinct from the second wavelength spectrum such that wavelengths associated with the first wavelength spectrum are not reflected by the second wavelength spectrum.

20. The optical fiber overheat detection testing apparatus of claim 18 further comprising, a test controller having stored test instructions operable upon execution to, responsive to a start command, increase a first temperature associated with the first fiber Bragg grating and receive a first temperature indication based on the first temperature.

* * * * *